United States Patent [19]

Harding

[11] 4,451,224

[45] May 29, 1984

[54] MOLD DEVICE FOR MAKING PLASTIC ARTICLES FROM RESIN

[75] Inventor: James H. Harding, Louisville, Ky.

[73] Assignee: General Electric Company, Louisville, Ky.

[21] Appl. No.: 361,996

[22] Filed: Mar. 25, 1982

[51] Int. Cl.³ .............................................. B29F 1/08
[52] U.S. Cl. .................................. 425/548; 425/572; 425/573
[58] Field of Search ........................ 425/548, 572, 573

[56] References Cited

U.S. PATENT DOCUMENTS

| | | | |
|---|---|---|---|
| 2,524,858 | 10/1950 | Thomas | 425/573 |
| 2,571,766 | 10/1951 | Saulino | 425/556 |
| 2,894,284 | 7/1959 | Allison et al. | 425/572 |
| 3,428,289 | 2/1969 | Heckrotte et al. | 249/105 |
| 3,520,026 | 7/1970 | Stidham et al. | 425/547 |
| 3,561,061 | 2/1971 | Bucy | 425/573 |
| 3,568,973 | 3/1971 | Rau | 425/572 X |
| 3,591,897 | 7/1971 | Perras | 425/144 |
| 3,623,692 | 11/1971 | Buhrer | 249/107 |
| 3,779,506 | 12/1973 | Adams | 249/110 |
| 3,819,312 | 6/1974 | Arpajian | 425/543 |
| 3,871,806 | 3/1975 | Leunig | 425/550 |
| 3,972,663 | 8/1976 | Taniguchi | 425/125 |
| 3,981,661 | 9/1976 | Taylor | 425/572 |
| 4,108,956 | 8/1978 | Lee | 264/161 |
| 4,126,292 | 11/1978 | Saeki et al. | 249/110 |
| 4,212,626 | 7/1980 | Gellert | 425/562 |
| 4,238,181 | 12/1980 | Dannels | 425/548 X |
| 4,239,476 | 12/1980 | Somberg | 425/556 |
| 4,249,882 | 2/1981 | Koch et al. | 425/547 |
| 4,298,332 | 11/1981 | Aoki | 425/570 |

OTHER PUBLICATIONS

Plastics Technology, 27, No. 4, p. 22, (Apr. 1981) "Hollow-Sprue Process Thermoset Molding Cycles".

Prost, Plastics Technology, 27, No. 5, pp. 67-69, (May 1981) "Hyperthermal Runner System".

Primary Examiner—Donald E. Czaja
Assistant Examiner—V. Fischbach
Attorney, Agent, or Firm—Frederick P. Weidner; Radford M. Reams

[57] ABSTRACT

An improved device for making plastic articles from resin and an improved runner block assembly for a mold for making plastic articles from resin have been made by providing a runner block assembly having at least one channel wherein the channel has a cross-section with two opposite sides having a length substantially less than the two other sides thereby forming a thin, flat channel sufficient to provide shear resistance resulting from forcing resin through the channel; means for connecting the channel to a plurality of mold cavities, and means for supplying resin to the channel. Plastic articles are made from resin in a heated mold assembly wherein heated, flowable resin is passed under pressure from a resin supply means through a flow passageway to a mold cavity, the improvement comprising, passing the heated, flowable resin into a runner block assembly wherein the flow passageway is at least one channel connected to the resin supply means, the channel extending from the resin supply means to the mold cavity and having a large heated surface with a thin, flat cross-section sufficient to provide shear resistance resulting from forcing the resin under pressure through the channel; heating the resin in the channel of the runner block assembly at a temperature of about at least as high as the temperature of the mold but less than the decomposition temperature of the resin; and passing the heated resin into the mold cavity. A typical resin is a phenolic resin containing 20% glass fiber filler.

24 Claims, 7 Drawing Figures

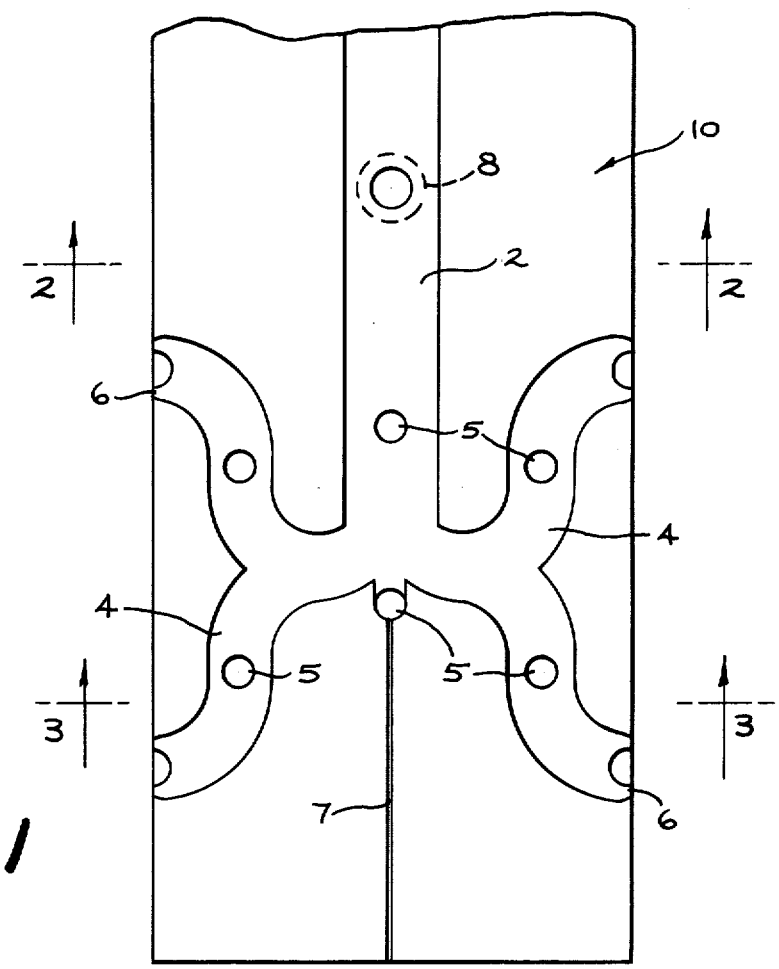
FIG. 1
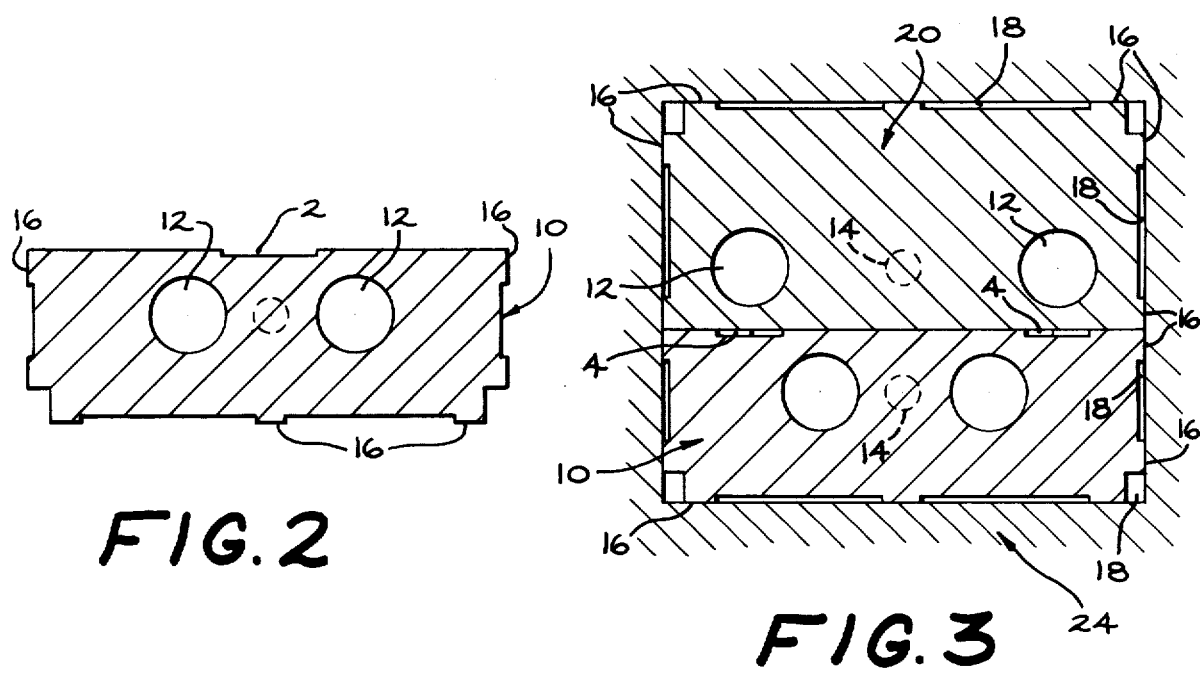
FIG. 2
FIG. 3

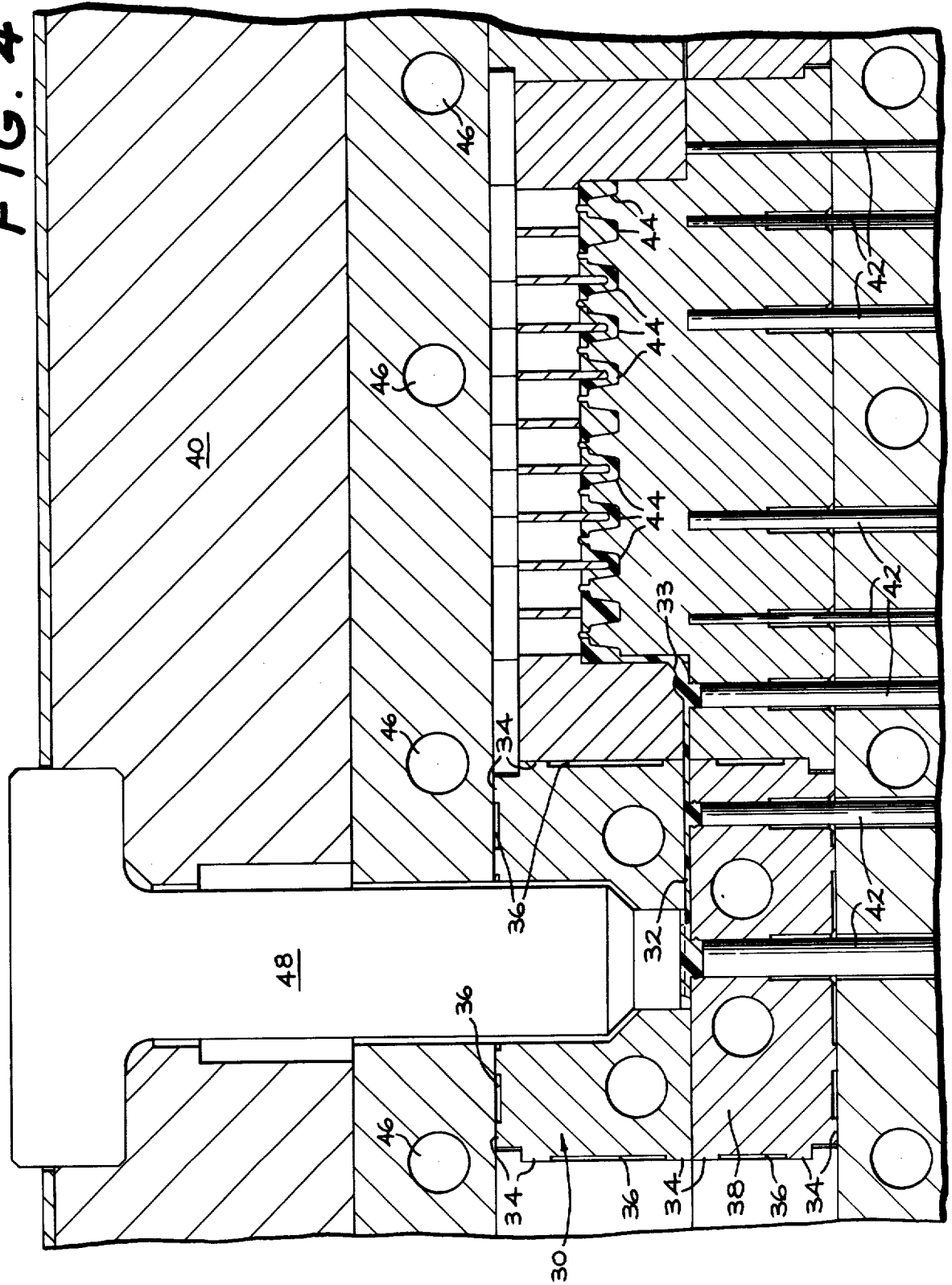

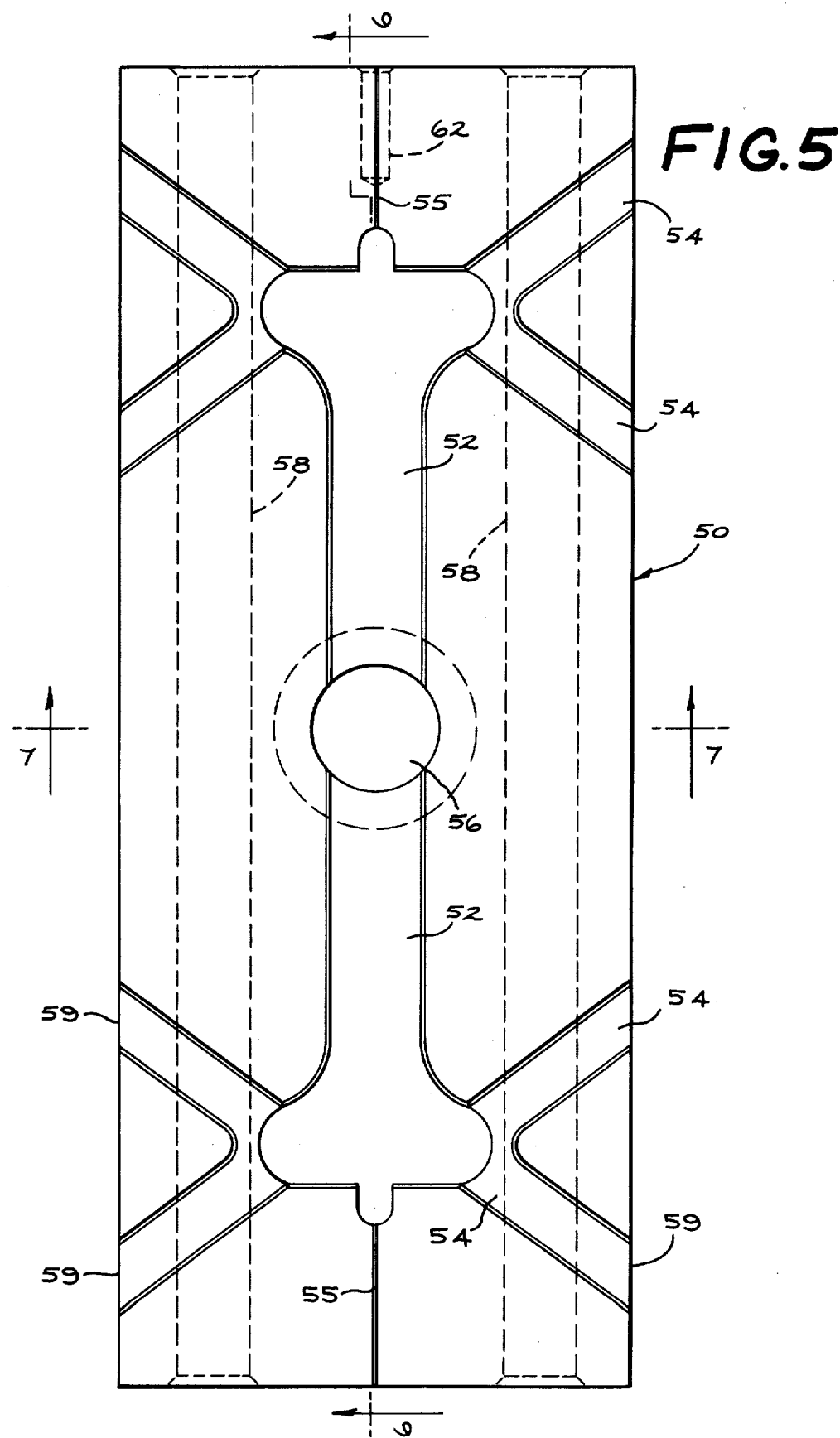

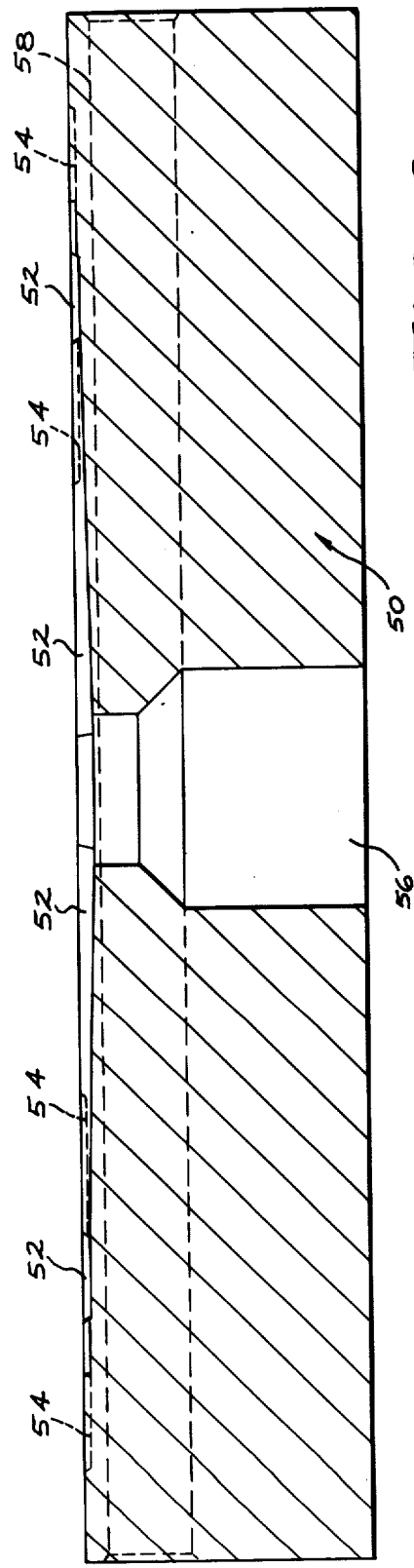
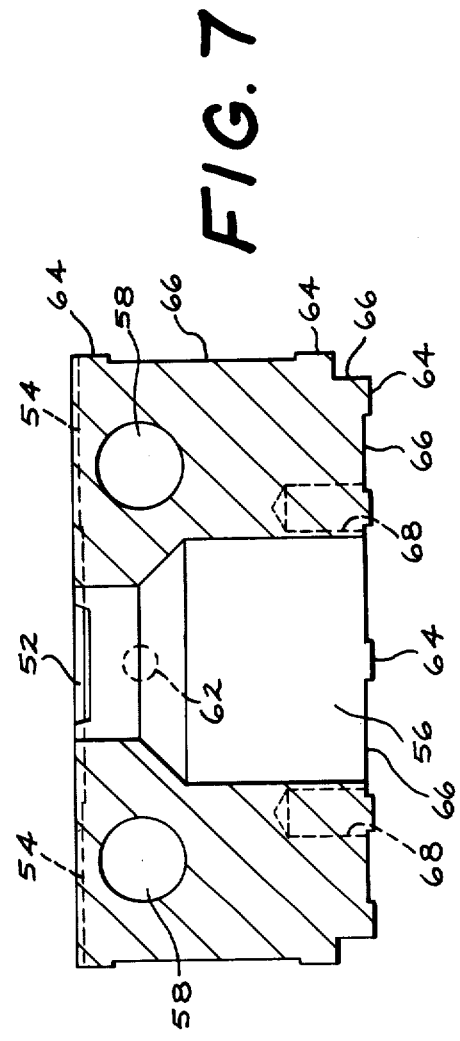

MOLD DEVICE FOR MAKING PLASTIC ARTICLES FROM RESIN

BACKGROUND OF THE INVENTION

This invention relates to a device and method for making plastic articles from resin, and more particularly, to an improved runner block in a mold assembly and a method for making plastic articles from thermoset resin material using the improved runner block in a mold assembly.

Various resins have generally been molded into articles by means of compression, transfer and injection molding processes and devices. Typical resins include thermoset materials, such as, phenolic resins, unsaturated polyester resins, urea resins, alkyd resins, melamine resins, melamine-phenolic resins and epoxy resins.

Generally, when resins are molded by any of the conventional processes and devices, the resins must be subjected to long molding cycles because heating of the resin to its final cure temperature occurs primarily through conductive heat transfer from the heated mold cavity into the resin material. As the heat transfers into the material, the plastic (resin) begins to shrink away from the cavity wall in the mold assembly. When the plastic material shrinks away from the cavity wall, the heat-transfer rate is slowed thereby increasing cure time of the resin.

Various attempts have been made to overcome the foregoing disadvantages, however, existing devices and processes are still deficient for various reasons. In those devices and processes wherein most or all of the elements of the mold assembly including the runners are heated by the application of an external source of heat, shrinkage of the plastic material, that is, the flowable resin melt, away from the runner walls still occurs, thereby resulting in inadequate heating of the resin material. In many cases, attempts have been made to overcome the foregoing disadvantages by providing various complicated designs and mechanisms for sprues or other resin supply means and for gates located between the runners and the mold cavities. However, most of the prior art designs are awkward to use in mold assemblies and/or cause unacceptable pressure differentials and/or cause defects in the molded plastic parts. Furthermore, in most of the existing devices and processes, there is considerable scrap resin material resulting from the runners and sprues, mold erosion, non-uniform curing, poor part density, poor gas removal, very slow cycle times, poor mold replication and the like.

In U.S. Pat. No. 4,126,292, in order to overcome the problem of equal filling velocity of resin in respective cavities in molds having multiple cavities and in order to overcome adverse effects on various characteristics of mold products, such as formation rate of voids, deformation of inserts, adhesive characteristics of resin to inserts, and the like, it is proposed to progressively or continuously reduce the cross-sectional area of runners in the direction farther from the pot, thereby minimizing a drop in fluid velocity of resin in the runner, and to progressively increase the convergent slope of a gate as the gate is spaced farther from the pot so that the pressure drops in a gate portion and a runner portion are equalized for each of the mold cavities, thereby minimizing a difference in fill time. Thus, to achieve improvements in filling mold cavities with resin material, in U.S. Pat. No. 4,126,292, not only is it necessary to provide convergent sloping portions between the inlet and exit of the respective gates in a mold assembly, each of the exits of each of the gates having the same size and cross-sectional configuration, but it is also necessary to provide the convergent sloping portion of each gate with an increasing inclination with an increase in distance of the corresponding cavities from the pot or sprue so that with the increasing inclination and the exits of the same size and cross-sectional configuration, the sum of a pressure drop in the runner connecting the pot or sprue with the inlet of the gate and a pressure drop in each gate is maintained equal for each of the respective cavities.

In U.S. Pat. No. 3,428,289, it appears that there is an attempt to overcome various prior art problems in devices and processes for molding resin materials, especially thermosetting materials, by providing specially-designed gates having a land of varying width to provide a controlled flow of the casting fluid out of a header, the gate running from the header to the mold cavity along substantially the entire length of the mold cavity adjacent the land wherein the gate width varies according to a complex formula. Thus, it appears that U.S. Pat. No. 3,428,289 teaches a complicated gate device and mechanism for overcoming prior art deficiencies in the making of plastic parts from thermosetting materials.

In view of the foregoing discussion, it is apparent that there is a need to provide a simplified, economical device and process for improving the molding of thermosetting resinous materials for the manufacture of plastic articles.

SUMMARY OF THE INVENTION

Accordingly, it is the primary object of the present invention to provide an improved device and method for making plastic articles from resin materials.

Another object of the present invention is to provide improved heating of thermoset resin material in devices and processes for making plastic articles from thermoset resins.

Still another object of the present invention is to provide reduced cycle time for making plastic articles from resin materials in molding devices and processes.

It is another object of the present invention to provide improved components in mold assemblies which decrease the amount of scrap material, improve mold replication, improve curing uniformity, improve the density of the plastic article and/or improve gas removal from the resin material.

It is a further object of the present invention to provide an improved runner block assembly and method of making a plastic article from the thermoset resins wherein shrinkage of the resin away from the runner is substantially eliminated.

Other objects and advantages of the present invention will become apparent when read in conjunction with the accompanying drawings and specification.

The objects of the invention are accomplished by providing an improved runner block assembly for a mold for making plastic articles from resin by providing at least one channel in the runner block wherein the channel has a cross-section of a configuration such that resin material being forced through the channel is subjected to a shear resistance. The shear resistance results from forcing the resin material through the channel which has cross-sectional dimensions generally defined as substantially wider than its height. By forming a thin, flat channel having tight dimensional tolerances and forcing heated, flowable resin therethrough, while providing an external source of heat in the runner block assembly so that the resin is more easily forced therethrough under pressure, there appears to be a synergistic effect which improves plastic parts molded thereby and which substantially reduces cycle time.

In accordance with the present invention, there is provided a runner block assembly for a mold for making plastic articles from resin comprising, a member having at least one channel therein, the channel having a cross-section wherein two substantially opposite sides have a length substantially less than two other sides thereby forming a thin, flat channel having close or tight tolerance sufficient to provide shear resistance resulting from forcing resin through the channel. In one embodiment, the runner block assembly for a mold for making plastic articles from resin comprises:

(a) a base member;

(b) at least one channel in a surface of the base member, the channel having a cross-section wherein two substantially opposite sides have a length substantially less than two other opposite sides thereby forming a thin, flat channel sufficient to provide shear resistance resulting from forcing resin through the channel;

(c) means for connecting the channel to a plurality of mold cavities;

(d) a removable metal cover member positioned adjacent the surface of the metal base member having the channel, the cover member forming at least a fourth side of the channel (e) means for securing the cover member to the base member sufficient to form a seal at the channel; and, (f) means for supplying resin to the channel.

In accordance with the present invention, there is also provided a device for making plastic articles from resin cmprising:

(a) a plurality of cavities in a mold assembly in which the plastic parts are formed;

(b) means for supplying resin;

(c) means for heating the mold assembly;

(d) a runner block in the mold assembly separated from the other elements of the mold assembly by a thermal barrier to insulate the runner block from the other elements of the mold assembly;

(e) at least one channel in the runner block connected to the means for supplying resin, the channel extending from the resin supply means toward the cavities for providing resin from the resin supply means to the cavities, the channel having a thin, flat cross-section sufficient to provide shear resistance resulting from forcing the resin under pressure through the thin, flat channel;

(f) means for forcing the resin from the resin supply means to the cavities; and (g) means for elevating the temperature of the runner block independent of the means for heating the mold assembly.

The present invention is also directed to an improved method of forming a plastic article from resin in a heated mold assembly comprising passing heated, flowable resin under pressure from a resin supply means through a flow passageway to a mold cavity, the improvement comprising:

(a) passing the heated, flowable resin into a runner block assembly wherein the flow passageway is at least one channel connected to the resin supply means, the channel extending from the resin supply means to the mold cavity and having a large heated surface with a thin, flat cross-section sufficient to provide shear resistance resulting from forcing the resin under pressure through the channel;

(b) heating the resin in the channel of the runner block assembly at a temperature of about at least as high as (approaching) the temperature of the mold but less than the decomposition temperature of the resin; and, (c) passing the heated resin into the mold cavity.

By using the improved runner block described above and by following the method of forming a plastic article from resin in a heated mold assembly as described above, it has been unexpectedly found that the cycle time is substantially reduced. By using channels or runners having thin, flat cross-sections which provide tight or constricted cross-sectional tolerances in elongated runners or channels, there is excellent heat transfer from the heated runner block, that is, heat applied in the area of the channel in the runner block, because there is substantially no shrinkage of the resin material in the channel or runner, that is, by using the runners or channels having thin, flat cross-sections in accordance with the process of the present invention, the resin material remains in substantial intimate contact with the walls of the channel inducing excellent heat transfer. Furthermore, in accordance with the process of the present invention and because of the thin, flat cross-section of the runners or channels, there is considerable shear resistance when the resin material is forced through the runner or channel which, it is believed, tends to produce an internal source of heat in the non-boundary layers of the resin. In the process of the present invention, the resin material is heated in the channel of the runner block assembly at a temperature approaching the temperature of the mold but less than the decomposition temperature of the resin. By the process and device of the present invention, thermoset resin materials are sufficiently heated in the runners or channels thereby accelerating cure in the channel and promoting easy filling of the mold cavity. The combination of mechanical shear and heat is synergistic and not only reduces the viscosity of the compound for faster mold filling but also brings the resin material closer to its cure temperature while it is in the thin, flat, elongated channel or runner. By the time the resin reaches the mold cavity, it is ready to "kick over", that is, it is substantially ready to cure. Thus, pressure and thermoconductivity have been used in the present invention to generate a low-viscosity melt. Thermoset resin material, like any plastic material, is a poor heat conductor. To generate maximum heat in the resin material, it is exposed in the runner system of the present invention, to a large heated surface area with a thin cross-section, so as to generate this heat as fast as possible. The runner system of the present invention is preferably designed so that the flow of material through it experience minimum pressure drop at any point until it reaches the mold cavity or optionally, until it reaches the gate.

By the improved device and process of the present invention, it has been found that there is less scrap in the runners and in the resin supply means, such as the sprues or pots, very fast cycle time, improved mold replication, more uniform curing, less mold erosion, improved part density, improved gas removal and improved performance properties.

Further objects of this invention together with additional features and advantages thereof will become apparent from the following detailed description of the preferred embodiments of the invention when read in conjunction with the accompanying drawings.

BRIEF DESCRIPTION OF THE DRAWINGS

FIG. 1 is a top view of the channels in a partial section of a runner block assembly.

FIG. 2 is a cross-sectional view of the runner block, taken along the line II—II of FIG. 1.

FIG. 3 is a cross-sectional view of the runner block, taken along the line III—III of FIG. 1 along with a cover member over the runner portion of the runner block.

FIG. 4 is a partial, cross-sectional, side view of part of a heated mold assembly illustrating the relationship of the improved runner block assembly to the mold assembly.

FIG. 5 is a top view or plan view of a runner block assembly illustrating an alternative channel configuration.

FIG. 6 is a cross-sectional, side view of the runner block taken along the line VI—VI of FIG. 5.

FIG. 7 is a cross-sectional, end view of the runner block taken along the line VII—VII of FIG. 5, and further illustrating the lateral channels in the runner block.

DETAILED DESCRIPTION OF THE INVENTION

Referring to FIG. 1, there is shown a portion of a runner block assembly 10 having an improved runner or channel system 2 and 4 as a passageway for heated, flowable resin material entering the runner 2 at resin supply means 8 to entry sites 6 where it passes into gates (not shown) or mold cavities (not shown). The runner configuration in FIG. 1 is positioned in a surface of a base member 10, preferably made of metal, and having heat supply means (not shown) therein. In the embodiment illustrated in FIG. 1, the runner block comprises main or primary channel or runner 2 and secondary or lateral channels or runners 4. Ejector pins 5 are shown throughout the channels to aid in the removal of cured resin therein. Gas vent 7 extends from the channel to remove gases which form or accummulate in the resin material.

In accordance with the improvement of the present invention, the cross-sectional dimensions of the channels or runners are critical insofar as they must be of a thin, flat cross-sectional configuration sufficient to provide shear resistance resulting from forcing resin through the channel. As the resin material passes through the channel or runner having tight tolerances (restricted cross-sectional configuration), the shear resistance is caused by the constriction of the resin in the channel or runner due to the thin, flat dimensions therein. Due to the combination of external heat applied to the runner block assembly and the development of the mechanical shear resistance as the resin material passes through the channel or runner having tight cross-sectional tolerances, the resin material is heated efficiently and quickly as it passes under pressure through the elongated channel having the thin, flat cross-sectional configuration, and the curing of the resin is accelerated.

Referring to FIG. 2, illustrating a cross-section of the base member 10 of the runner block assembly, heating means 12 is provided for heating resin material as it passes through channel or runner 2. In preferred embodiments, means for controlling the temperature in the runner block illustrated by heat supply means 12 is provided so that the resin in the channels in the runner block reaches a temperature approaching the temperature of the mold assembly but less than the decomposition temperature of the resin. Any conventional heating means may be used to heat the runner block assembly including a cartridge heater, a CALROD ® heater, an electrical resistance heating element of the sheathed tubular type, circulating hot oil and the like disposed in runner block 10. It is considered to be within the purview of one skilled in the art to provide any adequate heating system for the runner block assembly to maintain the resin material in the channels or runner in the block at the desired temperatures.

FIG. 2 further illustrates that embodiment of the present invention in which runner block 10 can be separated from the other elements of the mold assembly by a thermal barrier which insulates the runner block from the other elements of the mold assembly. Runner block 10 is provided with spacers 16 which prevent most sections of the block from directly engaging the other elements (not shown) of the mold assembly to prevent heat transfer between the other elements of the mold assembly and the runner block. The substantial isolation of runner block 10 from the other elements of the mold assembly permits the maintenance of the runner block at a temperature different from that of the adjacent elements of the mold assembly. Accordingly, in accordance with the preferred embodiments of the present invention, the resin material in the channels and runners of the runner block assembly can be heated at a temperature less than, equal to or higher than the temperature at which the other elements of the mold assembly are maintained. In this way, the thermoset resin material can be heated to the threshold polymerization or cure temperature ("kick over" temperature) within the runner or runners just prior to its entry into the mold cavities, thereby improving the curing, mold replication, density, gas removal and general performance properties of the plastic parts formed from the resin material.

Referring to FIG. 3 which illustrates another cross-sectional view of runner block 10, secondary or lateral runners 4 also having the thin, flat cross-sectional configuration described above are shown in the runner block assembly. Laterally disposed or secondary channels 4 also have the thin, flat cross-sectional configuration sufficient to provide shear resistance resulting from forcing the resin under pressure through the thin, flat channel having tight tolerances, and heat supply means 12 provide an external source of heat for heating the resin material in channels 4 so that the heat supplied for heating the resin material from external heat supply means 12 heats the resin in the channel at a temperature of about at least as high as, that is, approaching, the temperature of the mold assembly but less than the decomposition temperature of the resin. Generally, in preferred embodiments, the resin in the channels of the runner block is heated at about 140° C. to about 240° C. In other embodiments, the runner block assembly may be heated at a temperature between that approaching the temperature of the mold assembly and about 55° C. above the temperature of the mold assembly. As pointed out above, the improvements of the present invention are achieved by rapid heating of the resin material in the runners or channels of the runner block (external conductive heating) combined with frictional shear resistance of the thermoset resin flowing under pressure through the thin, flat elongated passageway or channel in the runner block. In conjunction with passing the resin material through the constricted channels or runners to provide frictional shear resistance, the resin material must be forced through the constricted runners or channels by any suitable pressure or propulsion means. The movement or velocity of the resin material in the constricted channels or runners is required to achieve the shear resistance and can be provided by one skilled in the art simply by providing conventional pressure means to exert a force on the resin material to force it through the thin, flat constricted, elongated channels or runners. Plungers in the pot, nozzle means and the like are examples of means for applying pressure to the resin. Generally, in the prior art, the use of high mold temperatures to achieve a lower viscosity because of the associated problems of surface heat and surface cure, which can cause blistering from gases evolved during the curing, are avoided. It is also clear that higher pressures will not generally generate any substantial frictional shear resistance in large-volume runner systems. Furthermore, in the prior art embodiments, higher preheating temperatures in plasticating barrels have been used, however, this results in pre-curing of the resin material in the barrel or in the channels or runners into which it is introduced. Thus, in accordance with the present invention, the heating of the resin material in the thin, flat, constricted, elongated channels of the runner block assembly at a temperature of about at least as high as (approaching) the temperature of the mold but less than the decomposition temperature of the resin heats the resin material at or near the threshold cure temperature so that immediately upon introduction of the resin material into the mold cavities from the runners or channels, the resin material polymerizes or cures, thereby reducing many of the prior art problems where it is necessary to apply large amounts of heat to the mold assembly so that heat can transfer from the mold assembly to the resin material being cured or polymerized in the cavities of the mold assembly.

FIG. 3 also illustrates the use of thermocouple 14 to measure the heat in the runner block assembly so that heating means 12 can be closely monitored and controlled to provide a sufficient amount of heat to the resin in the runners or channels to insure proper curing of the thermoset resin material. In FIG. 3, spacers 16, which can form an integral part of the runner block 10, are used to separate the runner block 10 and 20 from the other elements 24 of the mold assembly. Spacers 16 separate the runner block assembly from other elements 24 of the mold assembly so that thermal barrier 18 is formed between the other elements of the mold assembly and the runner block assembly. Although any type of insulation may be used to isolate the runner block assembly from the other elements of the mold assembly, in preferred embodiments, thermal barrier 18 is an air gap which provides suitable insulation between the runner block assembly and the other elements of the mold assembly. It is within the purview of one skilled in the art to provide any suitable isolation of the runner block assembly from the other elements of the mold assembly and to provide insulation between the runner block assembly and the mold assembly so that the runner block assembly can be maintained at a temperature different from the temperature of the other elements of the mold assembly.

FIG. 3 also illustrates the complete cross-sectional view of a typical runner block assembly comprising a metal base member 10 generally known as the movable portion of the runner block in preferred embodiments; at least one channel 4 in a surface of the metal base member, channel 4 having a cross-section wherein two substantially opposite sides have a length substantially less than two other sides thereby forming a thin, flat channel 4 sufficient to provide shear resistance resulting from forcing resin through the channel; metal cover member 20 positioned adjacent the surface of metal base member 10 having channel 4 therein and generally known in preferred embodiments as the stationary portion of the runner block, the cover member forming at least a fourth side of the channel 4; and heat supply means 12 for elevating the temperature of the runner block assembly. FIG. 1 illustrates entry means 6 for connecting the channel or runner to a plurality of mold cavities. Base member 10 may be secured to cover member 20 by any suitable means sufficient to form a seal at the channel, for example, it may be secured by using screws (not shown) passing from runner block 10 into cover member 20, or it may be secured by providing clamping means (not shown) which can be easily removed so that the channels and runners in the runner block assembly can be easily cleaned, and so that cured resins can be easily removed from the runners or channels generally simultaneously with the removal of the molded plastic parts from the mold cavities.

Referring to FIG. 4, the runner block assembly 30 is shown in a typical relationship with a portion of the other elements of a mold assembly.

Resin material, generally in the form of a heated, flowable resin or melt is supplied to the runner block assembly by means of resin supply means 48. Although any conventional means for supplying resin to the channel or runner in runner block assembly 30 may be used, including a conventional pot or sprue equipped with suitable means for applying pressure to the resin to force the resin into the channel and further into the mold cavity, in preferred embodiments, resin supply means 48 is a water cooled nozzle, a conventional sprue or a hot cone member as described by Prost in Plastics Technology 27, No. 5, pages 67-69, May 1981. As illustrated in FIG. 4, resin supply means 48 is an upstanding member and channel or runner 32 communicating therewith is a horizontal channel in the runner block assembly base member 38 covered by cover member 30 and secured thereto by suitable means (not shown) sufficient to provide a seal at the channel 32. In preferred embodiments runner block 30 is a stationary member and runner block 38 is a movable member.

Runner block assembly 30 and 38 have spacers which isolate the runner block assembly from the other elements of mold assembly 40 and form air gaps 36 as a thermal barrier between the runner block assembly and the other elements of the mold assembly. Ejector pins 42 are shown throughout the mold assembly and are used to remove or eject cured or set resin from the mold and other elements of the mold assembly by conventional means. As illustrated in FIG. 4, channel 32 communicates with the mold cavity in which plastic parts to be molded (work pieces) are formed and are represented by numeral 44. Gate 33 is disposed between runner 32 and the mold cavity which contains work pieces 44. As explained above, suitable pressure means may be used for forcing the resin from the resin supply means to cavities 44, and one skilled in the art can provide any conventional device for providing sufficient pressure to force the heated, flowable thermoset resin material through the constricted, thin, flat, elongated channels or runners to provide the adequate amount of shear friction and a suitable velocity so that the resin material reaches the threshold cure at the time it exits the runner system and enters the mold cavities. In FIG. 4, heating means 46 are provided as a supply of heat for heating the mold assembly 40. Any conventional heating elements may be used for this purpose as described above for the runner block assembly.

As the resin material enters the runner or channel in the runner block assembly, the resin must be heated and flowable. Accordingly, means for preheating the resin before the resin is introduced into the channel should be provided so that the resin is flowable or in the form of a melt. This may be carried out by any conventional preheating means well-known in the art. For example, the material may be preheated with a screw plasticator or preform heater to the desired temperature, for example, at any temperature which provides a melt of the resin material under pressure. This temperature varies according to the particular resin material and the ingredients in the resin formulation. For one preferred embodiment of the present invention, the resin material is preheated at a temperature of about 115° C., however, any suitable temperature may be used as long as the thermoset resin does not prematurely cure before it reaches the runners or the mold cavity.

Since gases are liberated and/or formed during the curing process which is being carried out in the runner or channel system of the runner block assembly because of the improvement of the present invention, it is generally desirable to provide vents or venting means for the release and/or removal of these gases during the transit of the heated, flowable, curing thermoset resin as it is in transit in the runners or channels. In certain preferred embodiments, the gases may be accommodated by laterally-positioned vents located at the ends of the channels or by upstanding vent means communicating with the runners or channels. Vent means are shown in FIGS. 1 and 5.

Although gates may be used in the devices and processes of the present invention as communicating means from the runners or channels to the mold cavities, because of the improved runners or channels of the present invention, gates are frequently optional. If gates are used, those which are typically used in molding thermoset compositions, may be used in the device of the present invention. Typical gates are disclosed in U.S. Pat. No. 4,126,292. In fact, the elimination of the conventional restrictive gate of the prior art systems is an advantageous feature of the present invention because by eliminating the restrictive gate there is less pressure drop in the transit or delivery of the resin material from the resin supply means to the mold cavities. Furthermore, it eliminates the requirement of using restrictive gates to add or dispense heat into the resin material prior to its entry into the mold cavities.

FIG. 5 illustrates one of the preferred passageway configurations in accordance with the present invention wherein the thin, flat, elongated channel is in the configuration of a "dog bone", and resin material which has been preheated, flows into primary channel 52 from resin supply means 56, such as, a sprue, and thereafter enters lateral or secondary channels 54 and enters the mold cavities (not shown) at mold cavity entry port 59. Channels 52 and 54 have the thin, flat cross-sectional configuration discussed above and described in more detail below. Gas venting means 55 may be provided at the ends of channel 52 for the removal of gases formed in the channels during the transit of the heated, flowable resin undergoing heating and shear resistance which accelerate cure, therethrough.

FIG. 6 shows a cross-sectional side view of the runner block 50 of FIG. 5. The secondary channels or runners 54 are shown in the sides of the runner block 50 and the dotted line extending from the resin supply means to the secondary channels 54 represents the primary channel or runner 52 extending from the resin supply means to the secondary runners. This drawing illustrates a preferred embodiment of the invention wherein runners 52 are sloping, that is they are variable in elevation in the runner block 50 from the point where they communicate with the entry supply means to the point where they communicate with secondary channels 54.

FIG. 7 is a cross-sectional view showing the runner block 50 from an end perspective. Heating means 58 are disposed within the runner block so that they provide heat from an external source for the resin in channels 52 and 54, and thermocouple 62 provides means for monitoring and controlling the temperature of heating means 58. Spacers 64 and thermal barriers 66 are also illustrated in FIG. 7. Conventional securing or attachment means 68 are used to mount the stationary portion of runner block 50 in the mold assembly.

As discussed above, the shear to reduce plastic or resin viscosity is obtained by forcing the heated, flowable resin material through the thin, flat runner or channel system which is of such cross-sectional dimensions that it constricts the flow of the resin therethrough and thereby produces shear resistance. As discussed above, generally the improved channel system is contained within two runner plates or blocks, otherwise described as a runner block or plate member having a cover member adjacent to the runner or runners, and the runner block assembly is thermally isolated from the remainder of the mold assembly so that the runner block assembly can be maintained at a temperature that is higher than the remaining elements of the mold assembly. In certain embodiments (not shown) portions of the channel may also be formed in the cover member so the cover member and the base member form the complete channel or passageway.

Generally, there is a limit to the amount of shear that can be applied to a thermoset material, and one skilled in the art can easily determine the length of a channel for providing a practical limit for the traverse of heated, flowable resin in a shear mode, depending upon the cross-sectional area of the channel or runner through which the resin traverses. In certain preferred embodiments the traverse of the channel is about 12.0 mm to about 500.0 mm. For example, if a large multi-cavity mold having considerable runner length is to be used in accordance with the process of the present invention, one skilled in the art would be able to design, in accordance with the process of the present invention, a suitable runner for shear resistance under temperature controlled conditions to deliver heated, flowable resin material from a resin supply means, such as, a water cooled sprue, to the runner which would provide the shear resistance. Thus, in accordance with at least some of the objects of the present invention, the temperature of thermoset plastic material is raised above the preheat temperature and approaching the temperature of the mold but below the decomposition temperature of the thermoset plastic material in the channel or runner in the runner block by the external source of heat provided in the runner block. The heat in combination with the shear resistance resulting from forcing the thermoset plastic material through the thin, flat runner in the runner block having dimensions sufficient to provide the shear resistance for the particular type of thermoset resin material, the type and quantity of filler material in the thermoset resin material and the particular polymerization initiator contained therein, provide the improvements of the present invention, and the resin in the thin, flat, elongated runner is brought to the threshold cure temperature just before it enters the mold cavity to form a cured plastic article therein.

The thin, flat channel is defined functionally herein as a channel having a cross-section sufficient to provide shear resistance in a thermoset resin material resulting from forcing the resin melt under pressure through the channel. Any channel configuration having the thin, flat cross-sectional dimensions sufficient to cause the shear resistance may be used in the runner block assembly and in the process of the present invention. The preferred channels or runners are those having a cross-section of a 4-sided polygon with two substantially opposite sides having a length substantially less than the two other opposite sides. In one embodiment, the channel is a 4-sided polygon having two opposite sides each having a length at least about 5 times longer than the length of the other two opposite sides. When expressed in terms of a rectangle, the width of the rectangle is at least about 5 times longer than the height of the rectangle. In certain preferred embodiments, the channel in the runner block assembly is a 4-sided polygon having two opposite sides each having a length of about 5 times to about 190 times longer than the length of the other two opposite sides, that is, in terms of a rectangle, the width of the rectangle is about 5 times to about 190 times longer than the height of the rectangle. In certain embodiments, the channel in the runner block assembly is a 4-sided polygon having two opposite sides each having a length of about 0.5 mm to about 3.0 mm, and the other two opposite sides each have a length of about 6.0 mm to about 100.0 mm. Preferred cross-sectional configurations of the runners of the present invention are rectangular and trapezoidal, including an inverted trapezoidal configuration. Other equivalent configurations may be easily determined by one skilled in the art.

In defining the length of the channels which may be used in the device and process of the present invention, the channels are elongated, that is they have a very large length (l) and a very small height (h) relative to the width (w) to provide an elongated channel having a thin, flat cross-section. The very large length is a traverse of about 12.0 mm to about 500.0 mm in preferred embodiments. As explained above, the length of the channel, that is, the dimension of the channel from the entry of the resin material at the resin supply means to the mold cavity, is not critical as long as it is sufficient to permit the resin material to reach its cure threshold, that is, just prior to that point wherein the resin material sets of cures. This parameter depends upon the particular thermoset resin material, the type and quantity of filler material in the resin material and the amount and type of polymerization initiator used therein. Typical channel or runner lengths vary from about 1.2 cm to about 50 cm, and in most preferred embodiments, the channel or runner length is about 4.0 cm to about 25 cm.

It is within the purview of one skilled in the art to provide as many channels or runners made in accordance with the improvements of the present invention as desired. Furthermore, any number of laterally-disposed or secondary runners or channels may be used to communicate with a primary or main runner so that a plurality of mold cavities may be served by a runner system made in accordance with the improvements of the present invention. In the preferred embodiments of the present invention, the runners are of nonuniform dimensions and the height of the runner decreases as the distance from the resin supply increase. The primary channel or channels may have a cross-sectional area greater than the cross-sectional area of secondary channels communicating therewith.

The improved process and device of the present invention are suitable for transfer molding wherein thermoset resin in a tablet form is placed in a pot, and for injection molding wherein molten thermoset resin is introduced into a sprue, a water cooled nozzle, a hot cone and the like. Most thermoset resins can be run successfully by the process of the present invention and through the runner block assemblies of the present invention. Existing and conventional thermoset resin materials perform satisfactorily in the improved runner system of the present invention. Thermoset resin materials containing such fillers as glass fibers can also be used in the improved runner system and process of the present invention. It has been found that glass fibers maintain their integrity in the thin, flat constricted runner system despite the high velocities and shear encountered by the material.

Conventional resin materials which are useful in the improved process and improved runner block assembly of the present invention, include those having the trade designations TMC, SMC, BMC, and PMC, and it is within the purview of one skilled in the art to adjust the formulations of the resin materials to achieve optimum results in the improved process and device of the present invention. For example, the quantity and type of filler material, catalyst or polymerization initiator, other additives, and the like may be varied and adjusted to provide optimum results. Furthermore, the cross-sectional area and the lengths of the particular channels of a runner block assembly may be optimized for a particular resin material so that the polymerization threshold is achieved while the resin material is in transit from the resin supply means to the mold cavities.

Preferred thermoset resins which may be used in the process of the present invention include phenolic resins, polyester resins, alkyd resins and the like. The foregoing resins which are filled with conventional fillers, such as, glass fibers, can also be used in the improved process and improved runner block assembly of the present invention. Those thermoset resins which reach the cure threshold and which cure in the mold cavity after passing through the improved runner system under mechanical shear resistance to form cured plastic articles, may be used in the present invention.

EXAMPLE

A runner system, heated separately from the mold cavities was designed and built into a single-cavity mold similar to the device shown in FIG. 4. The runner had an average cross-section of about 0.32 cm.

The overall size of the first production part made by the process of the present invention was about 11.5 cm $\times$ 2.5 cm $\times$ 2.5 cm. The mold assembly had a gate which was about 4.0 square mm.

The mold cycle on the runner system was initially set at fifty-five seconds at start-up. Total cycle was eventually reduced to 35 seconds. The material used was a general purpose phenolic resin. The parts produced met all quality specifications, including dimensional and flatness requirements. Furthermore, there was no strong ammonia odor which normally accompanies the use of these materials, and it was found that the high heat involved in the process dispersed the ammonia to greater than normal before it was trapped in the part. There was no evidence of porosity, even in a thin rib section of the mold. Furthermore, the part was molded practically flash-free. Conventional mold assemblies having conventional runner systems, had a normal cycle time of 50–60 seconds.

It was found that gas dissipation took place primarily in the area of the locally super-heated runner system in the runner block. Therefore, a smaller amount of the volatile gases was trapped in the molded part.

In other comparison tests run in the mold assembly having the improved runner block assembly therein, and run in accordance with the improved process of the present invention it was shown that parts molded with the new runner system exhibited enhanced physical properties and better glass integrity relative to conventionally molded products. The lower viscosity produced by rapid heating in the channels and the mechanical shear resistance is believed to be responsible for these results.

Several molds incorporating the new runner block assembly have been constructed, and different types of thermoset materials have been molded in mold assemblies using the improved runner block assemblies. Cycle times as low as 15 seconds have been achieved using thermoset resin materials in these improved mold assemblies. One mold assembly having a shot size of 500 grams of thermoset resin, an injection time of 4 seconds and using a resin having a cure time of 20 seconds, was found to produce high quality plastic parts using the improved runner block assembly and process of the present invention under laboratory conditions.

By using the improved runner system in the runner block assembly and by using the improved process of the present invention, wherein a shear resistance is produced in the runner system for thermoset molding of resin materials, wherein the runner block assembly is thermally isolated from the other elements of the mold assembly so that the temperature of the runner block assembly can be controlled separately from the other elements of the mold assembly, it has been found that less scrap accummulates in the runners and sprues; very fast cycle times were achieved; improved mold replication occured; more uniform curing occured; less mold erosion was encountered; and improved part density, gas removal and performance properties were achieved.

While the invention has been described with respect to preferred embodiments, it will be apparent that certain modifications and changes can be made without departing from the spirit and scope of the invention, and therefore, it is intended that the foregoing disclosure be limited only by the claims appended hereto.

What is claimed is:

1. A device for making plastic parts from resin comprising:
   (a) a plurality of cavities in a mold assembly in which the plastic parts are formed;
   (b) a means for supplying resin;
   (c) means for heating the mold assembly;
   (d) a runner block in the mold assembly separated from the other elements of the mold assembly by a thermal barrier to insulate the runner block from the other elements of the mold assembly;
   (e) at least one channel in the runner block connected to the means for supplying resin, the channel extending from the resin supply means toward the cavities for providing resin from the resin supply means to the cavities, the channel having thin, flat dimensions with two opposite sides thereof having a length substantially less than the length of the other two sides so that the channel has a cross-section sufficient to provide shear resistance resulting from forcing the resin under pressure through the thin, flat channel;
   (f) means for forcing the resin from the resin supply means to the cavities; and
   (g) means for elevating the temperature of the runner block independent of the means for heating the mold assembly.

2. The device of claim 1 further comprising means for preheating the resin before the resin is introduced into the channel.

3. The device of claim 1 further comprising means for controlling the temperature in the runner block so that the resin in the channel reaches a temperature approaching the temperature of the mold but less than the decomposition temperature of the resin.

4. The device of claim 1 wherein the channel is a four-sided polygon having a traverse of about 12.0 mm. to about 500.0 mm.

5. The device of claim 1 wherein the channel is a four-sided polygon with two opposite sides each having a length about 5 times to about 190 times greater than the length of the other two opposite sides.

6. The device of claim 1 wherein the channel is a four-sided polygon with two opposite sides each having a length of about 0.5 mm to about 3.0 mm and the other two opposite sides each having a length of about 6.0 mm to about 100.0 mm.

7. The device of claims 1, 4, 5 or 6 wherein the four-sided polygon is a rectangle.

8. The device of claims 1, 4, 5 or 6 wherein the four-sided polygon is a trapezoid.

9. The device of claim 1 wherein the means for heating the runner block is a cartridge heater disposed in the block.

10. The device of claim 1 wherein the means for supplying resin is a sprue.

11. The device of claim 1 further comprising gates positioned between the channel and the cavities.

12. The device of claim 1 wherein the thermal barrier is an air gap which separates the runner block from the other elements of the mold.

13. A runner block assembly for a mold for making plastic parts from resin comprising:
   (a) a base member;
   (b) at least one channel in a surface of the base member, the channel having a cross-section wherein two opposite sides have a length substantially less than two other opposite sides thereby forming a thin, flat channel sufficient to provide shear resistance resulting from forcing resin through the channel;
   (c) means for connecting the channel to a plurality of mold cavities;

(d) a removable cover member positioned adjacent the base member on the side of the channel and the cover member forming at least a fourth side of the channel;

(e) means for securing the cover member to the base member sufficient to form a seal at the channel;

(f) means for supplying resin to the channel; and (g) means for elevating the temperature of the runner block assembly.

14. The runner block assembly of claim 13 further comprising a plurality of gates connecting the channel to the plurality of mold cavities.

15. The runner block assembly of claim 13 wherein the mean elevating the temperature of the runner block assembly is a cartridge heater disposed in the base member.

16. The runner block assembly of claim 13 wherein the means for elevating the temperature of the runner block assembly is a sheathed tubular heater disposed in the base member.

17. The runner block assembly of claims 15 or 16 further comprising means for controlling the temperature in the runner block so that resin in the channel reaches a temperature approaching the temperature of the mold but less than the decomposition temperature of the resin.

18. The runner block assembly of claim 13 wherein the channel is a four-sided polygon having a traverse of about 12.0 mm to about 500.0 mm 19. The runner block assembly of claim 13 wherein the channel is a four-sided polygon having two opposite sides each having a length about 5 times to about 190 times longer than the length of the other two opposite sides.

20. The runner block assembly of claim 13 wherein channel is a four-sided polygon having two opposite sides each having a length of about 0.5 mm to about 3.0 mm and the other two opposite sides each having a length of about 6.0 mm to about 100.0 mm.

21. The runner block assembly of claims 13, 18, 19 or 20 the four-sided polygon is a rectangle.

22. The runner block assembly of claims 13, 18, 19 or 20 wherein the four-sided polygon is a trapezoid.

23. The runner block assembly of claim 13 wherein the mean supplying resin to the channel is a sprue.

24. The runner block assembly of claims 13 or 23 further comprising pressure means for forcing the resin through the channel.

* * * * *